Sept. 30, 1947.   W. E. RIVARD ET AL   2,428,321
HOP PICKING FINGERS
Filed Jan. 8, 1945

Inventors
*Wilfred E. Rivard &
Freddie Morford*

Patented Sept. 30, 1947

2,428,321

UNITED STATES PATENT OFFICE 2,428,321

HOP PICKING FINGERS

Wilfred E. Rivard, Moxee City, and Freddie Morford, Yakima, Wash.; said Morford assignor to said Rivard Application January 8, 1945, Serial No. 571,822

4 Claims. (Cl. 130—30)

This invention consists of hop picking fingers of novel construction which we have found to overcome recognized disadvantages.

In hop picking machines, as presently used, there are approximately twenty thousand fingers per machine and it is necessary after each day of operation to check each of the fingers, many of which invariably require straightening. During the straightening operation some of the fingers break, due principally to crystallization, and must be replaced. The maintenance and replacement of the fingers is costly and in addition, each finger bent during operation, decreases the operating efficiency of the machine. After much experiment, we have found that the device of the present invention corrects these shortcomings with the result that the original operating efficiency of the fingers, and their appurtenances, is retained throughout the entire hop picking season.

It is therefore within the contemplation of this invention to provide hop picking fingers which are not subject to distortion, when normally used, yet are inherently resilient to yield, under load, within predetermined limits.

It is further within the objects of the invention to employ fingers which will be unaffected by crystallization; to reinforce each finger at its locus of stress; to provide a finger which may be flexed to any degree within maximum demands even under extraordinary working conditions; to provide a finger in which the yieldable reinforced portions are coaxial with the fingers to retard crystallization of the fingers and effect instant return of the fingers to their normal position upon release of load stress; and to provide fingers which may be used with standard hop picking machines without appreciable increase in cost.

It is also an object of this invention, not only to provide a hop picking finger which includes a pair of springs arranged in a particular manner, but likewise to interengage the fingers preparatory to securing the latter to the finger bar for uniform distribution of stress.

Other objects of the invention will be apparent from the following description of the present preferred form of the invention wherein.

Figure 1:
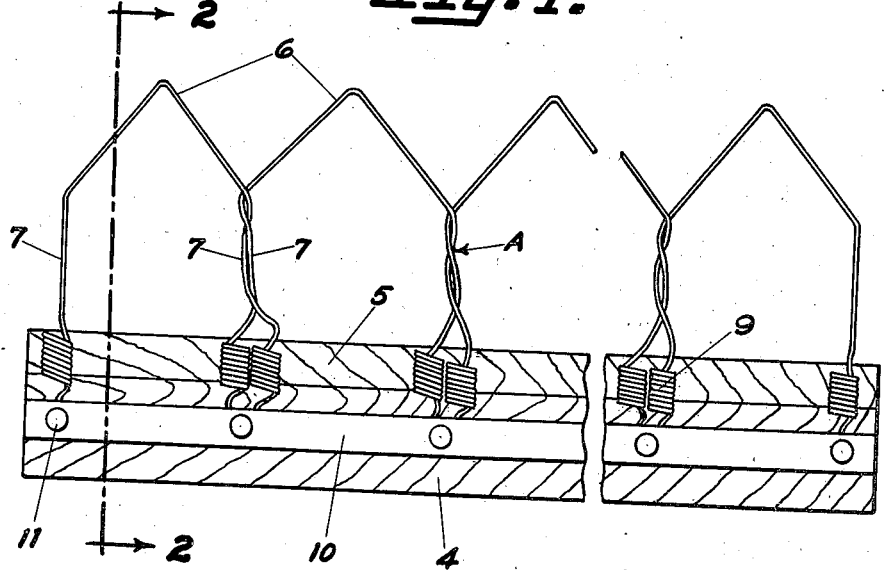
Figure 1 is a fragmentary plan view of a hop picker bar and fingers constructed in accordance with the present invention.
Figures 2, 3:
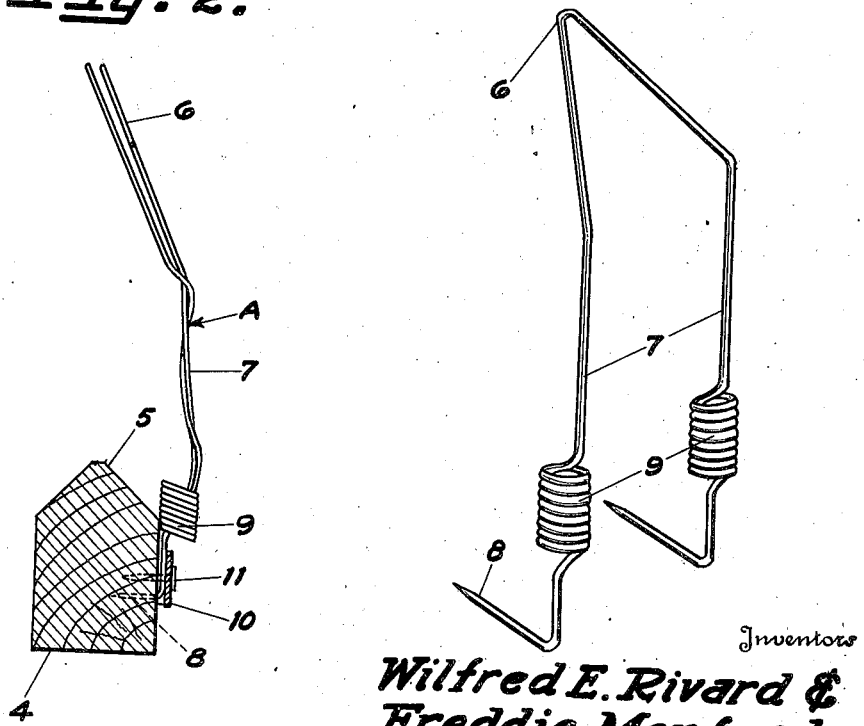
Figure 2 is a transverse sectional view taken on the line 2—2 of Figure 1, looking in the direction of the arrows.
Figure 3 is a perspective view of a finger per se.

To illustrate the application of the present invention, we have, in Figures 1 and 2 shown a finger bar 4, the forward edge of which is tapered or beveled, as indicated at 5. To this bar, fingers 6, constructed in accordance with the present invention are anchored.

Each of the fingers is of conventional, substantially V-shaped configuration, and includes a pair of parallel shanks 7. The free terminals of the shanks are bent at right angles and pointed to provide spurs or anchoring terminals 8 which are adapted to be urged into one face of the bar 4, as shown to advantage in Figure 2. Each of the shanks is intermediately convoluted as indicated at 9, to reinforce the shanks at the loci of greatest stress. The convolutions 9 are formed by rolling the shanks into contiguous axially extending coils which yield sufficiently for effective functioning of the picking fingers. The convolutions prevent undue flexure of the fingers and correspondingly, finger distortion is prevented. By this means, finger breakage, which frequently occurs during the straightening operation, is also automatically eliminated. Preparatory to engaging the free ends of the fingers to the bar 4, the proximate shanks 7 of each adjacent pair of fingers are interlaced, as indicated at A. The convoluted part 9 of each shank is axially offset and the shank of one finger lies within the plane of the adjacent finger. As shown in Figure 2, the convolutions 9 extend beyond the body of the bar 4 and over one of the beveled faces 5 of the latter.

The fingers are held from displacement on the bar 4 by a locking strip 10 which is preferably nailed to the bar in a particular manner. Nails, indicated at 11, are driven through openings in the strip 10 at predetermined intervals. These intervals are so spaced that each nail will extend between an adjacent pair of spurs 8.

By interlacing or interengaging the fingers, load stress on a single finger is eliminated. Not only does this result in load distribution, but the fingers are reinforced and crystallization reduced to a minimum. The particular positioning of the convolutions 9 provides, in effect, what is tantamount to a right hand and left hand spring, which, in addition to other advantages, also takes care of torsional strain. Actual tests of fingers made in accordance with the teaching of the present invention and attached to the finger bars herein set out, have resulted in a complete elimination of finger distortion over an entire hop picking season. Obviously, straightening of the fingers is therefore unnecessary, with a consequent absence of finger breakage.

While we have herein described a preferred embodiment of our invention, we are aware that various changes may be made therein, within the scope of the claims hereto appended.

What we claim is:

1. In a hop picking machine, a bar and fingers comprising substantially parallel shank portions and V-shaped tip portions with the shank portions provided with means to anchor them to the bar, adjacent shanks of the fingers being interlaced intermediate their ends, the shanks of the fingers being coiled between the points of interlacing and the points where the fingers are anchored to the bar, said coils extending axially and substantially parallel to the shank portions.

2. In a hop picking machine, a bar and fingers comprising substantially parallel shank portions and V-shaped tip portions with the shank portions provided with means to anchor them to the bar, adjacent shanks of the fingers being interlaced intermediate their ends, the shanks of the fingers being coiled between the points of interlacing and the points where the fingers are anchored to the bar, said coils extending substantially parallel to the shank portions.

3. A hop picker comprising a bar, fingers anchored on the bar, each of the fingers including a pair of shanks, the adjacent shanks of each pair of fingers being interlaced, the shanks of the fingers being coiled between the points of interlacing and the points where the fingers are anchored to the bar, said coils extending parallel to the shank portions.

4. A hop picker comprising a bar, fingers anchored on the bar, each of the fingers including a pair of shanks, the shanks of the fingers being coiled in close proximity to the point where the fingers are anchored to the bar, said coils extending substantially parallel to the shank portions.

WILFRED E. RIVARD.
FREDDIE MORFORD.

REFERENCES CITED

The following references are of record in the file of this patent:

UNITED STATES PATENTS

| Number | Name | Date |
|---|---|---|
| 968,001 | Trowbridge | Aug. 23, 1910 |
| 1,776,736 | Livermon | Sept. 23, 1930 |
| 2,139,029 | Miller | Dec. 6, 1938 |
| 2,191,183 | Thys | Feb. 20, 1940 |